(12) United States Patent
Uemoto

(10) Patent No.: US 8,387,373 B2
(45) Date of Patent: Mar. 5, 2013

(54) EXHAUST GAS COMBUSTION DEVICE AND POWER GENERATOR INCLUDING THE SAME

(75) Inventor: Tamaki Uemoto, Hiroshima (JP)

(73) Assignee: Yamabiko Corporation, Ome-shi (JP)

( * ) Notice: Subject to any disclaimer, the term of this patent is extended or adjusted under 35 U.S.C. 154(b) by 255 days.

(21) Appl. No.: 12/791,218

(22) Filed: Jun. 1, 2010

(65) Prior Publication Data

US 2010/0300083 A1    Dec. 2, 2010

(30) Foreign Application Priority Data

Jun. 2, 2009    (JP) ................................ 2009-132649

(51) Int. Cl.
*F01N 3/26*    (2006.01)
(52) U.S. Cl. ............... 60/303; 60/285; 60/295; 60/297; 60/300; 60/311; 60/320
(58) Field of Classification Search .............. 60/285, 60/295, 297, 300, 303, 311, 320
See application file for complete search history.

(56) References Cited

U.S. PATENT DOCUMENTS

| | | | |
|---|---|---|---|
| 2003/0196430 A1* | 10/2003 | Brown et al. | 60/297 |
| 2004/0226287 A1* | 11/2004 | Edgar et al. | 60/295 |
| 2009/0113874 A1* | 5/2009 | McKee | 60/272 |
| 2009/0120074 A1* | 5/2009 | Hirata et al. | 60/297 |
| 2010/0186373 A1* | 7/2010 | Pierz et al. | 60/274 |

FOREIGN PATENT DOCUMENTS

| | | |
|---|---|---|
| JP | 8-232639 | 9/1996 |
| JP | 2006-241978 | 9/2006 |

* cited by examiner

*Primary Examiner* — Thomas Denion
*Assistant Examiner* — Jorge Leon, Jr.
(74) *Attorney, Agent, or Firm* — Morrison & Foerster LLP

(57) ABSTRACT

Provided is an exhaust gas combustion device which is capable of early prevention of clogging, and also a power generator including the device. An exhaust gas combustion device of the present invention includes: a DPF; a sensor which measures the pressure of exhaust gas to be introduced into the DPF; a sensor which measures the pressure of exhaust gas purified by the DPF; and a controller which receives outputs from both sensors and calculates a pressure difference. When the pressure difference is equal to or larger than a preset threshold, the heater is supplied with power from a power generating unit to thereby heat exhaust gas. Accordingly, PM accumulated inside the DPF is combusted and removed, preventing excessive clogging of the DPF even during light-load operation.

9 Claims, 3 Drawing Sheets

EXHAUST GAS COMBUSTION DEVICE AND POWER GENERATOR INCLUDING THE SAME

BACKGROUND OF THE INVENTION

1. Field of the Invention

The present invention relates to an exhaust gas combustion device and a power generator including the device. In particular, the present invention relates to an exhaust gas combustion device that combusts exhaust gas discharged from a diesel engine and also to a power generator including the device.

2. Description of the Related Art

A general power generator obtains power by driving a power generating unit by an engine. When a diesel engine is employed as the engine, particulate matter (hereinbelow, abbreviated as PM) contained in exhaust gas from the engine needs to be removed.

One method for removing PM from exhaust gas is to dispose a diesel particulate filter (hereinbelow, abbreviated as DPF) made of a porous material in an exhaust pipe through which exhaust gas discharged from a diesel engine passes. By this method, most of the PM contained in the exhaust gas is collected by the DPF. Therefore, the exhaust gas discharged to the outside is highly purified.

However, after continuous operation of the diesel engine over a long period of time, the DPF with the PM adhering thereto comes to block the flow of exhaust gas. This, as a result, causes a problem of lowering the output of the diesel engine. Thus, regeneration operation is generally performed to remove the PM adhering to the DPF.

One example of the regeneration operation is thermal regeneration which regenerates a filter by combusting PM by heating. In the thermal regeneration, after PM contained in exhaust gas is collected by a DPF, an electric heater provided to the DPF is electrified to heat and combust the PM, whereby the PM adhering to the DPF is burned off and the filter is regenerated (Japanese Patent Application Publication No. Hei 08-232639).

Meanwhile, another example of the regeneration operation is self regeneration which uses a DPF in combination with an oxidation catalyst. In the self regeneration, exhaust gas to be introduced into the DPF is constantly maintained at a high temperature, and fuel injected into the exhaust gas by post injection is combusted with the catalyst, whereby PM adhering to the DPF is combusted (Japanese Patent Application Publication No. 2006-241978). By employing this method, the regeneration treatment can be performed continuously, without having to stop the diesel engine.

SUMMARY OF THE INVENTION

However, the regeneration method described in Japanese Patent Application Publication No. 2006-241978 cited above is a technique implementable in a diesel engine equipped with a common rail injection system in which supply of fuel to the engine is controlled electronically. In a diesel engine equipped with a mechanical injection pump which mechanically controls the fuel injection quantity, whether or not to inject fuel and the injection quantity cannot be adjusted by electronic control. It is therefore difficult for such diesel engine to perform self regeneration of its filter by combusting fuel with exhaust gas.

For this reason, a diesel engine whose fuel injection quantity is controlled by a mechanical injection pump removes PM artificially by thermal regeneration, but doing so has the following problems.

First, clogging of a DPF may be prevented by performing maintenance, i.e., thermal regeneration on a regular basis before the DPF is clogged. In this case, however, the thermal regeneration requires use of a dedicated filter regeneration mechanism. Moreover, clogging may be cleared by heating with a heater included in the DPF, but such case requires an additional commercial power supply for electrifying the heater. Hence, these cases have a problem of limiting the operation time and operation area of a machine (a power generator, a working device, or a vehicle) equipped with the engine.

Second, a machine may be equipped with a small-capacity power generator for thermal regeneration of the DPF. In this case, however, the equipped small-capacity power generator is not for a main purpose of the machine and thus is limited in terms of the margins of space and engine output. Accordingly, the machine cannot be equipped with a large-capacity power generator, leading to a limited capacity of the heater and thus making time required for the DPF thermal regeneration longer.

Third, multiple DPFs may be disposed in parallel with each other in the passage of exhaust gas so that the DPFs can be regenerated while keeping the operation of the machine including the DPFs with no stop. However, such configuration leads to a problem of making the whole machine larger.

Moreover, the above problems are remarkable when a machine to be used continuously over a long period of time, such as a submergible pump in a field of foundation work, is employed as a load of a portable power generator. The reason is that stopping the engine for regeneration of the DPF is difficult due to the nature of the load. Another reason is that a submergible pump is generally a light load and is used continuously over a long period of time, and therefore the temperature of exhaust gas from the diesel engine does not increase, resulting in adhesion of a large amount of PM to the DPF.

The present invention has been made in view of the above-described problems, and an object thereof is to provide an exhaust gas combustion device in which clogging is prevented and also a power generator including the device.

The exhaust gas combustion device of the present invention is an exhaust gas combustion device provided to a power generator including a diesel engine whose fuel injection quantity is controlled mechanically and a power generating unit which is driven by the diesel engine. The exhaust gas combustion device comprises: a collector which collects particulate matter contained in exhaust gas discharged from the diesel engine; a heater which heats the exhaust gas before introduced into the collector; a sensor which measures a pressure of the exhaust gas to be introduced into the collector; and a controller which controls the heater on the basis of an output from the sensor. The power generating unit is configured to supply power to both a load connected to the power generator and the heater connected to the power generating unit in such a manner as to supply one part of the power to the load and supply the other part of the power to the heater. When a value measured by the sensor is equal to or larger than a predetermined value, the controller increases the power outputted from the power generating unit by allowing the heater to be supplied with the other part of the power generated by the power generating unit, so that a temperature of the exhaust gas discharged from the diesel engine rises, and also that the exhaust gas is heated by the heater.

In the exhaust gas combustion device of the present invention, the collector is a diesel particulate filter. The sensor includes a first sensor and a second sensor, the first sensor measuring a pressure of the exhaust gas before introduced into the diesel particulate filter, the second filter measuring a pressure of the exhaust gas after passing through the diesel particulate filter. The controller calculates a pressure difference between the pressure measured by the first sensor and the pressure measured by the second sensor. When the pressure difference is equal to or larger than a predetermined value, the controller allows the heater to be electrified to heat the exhaust gas at least to such a temperature that the particulate matter is combusted and removed.

In the exhaust gas combustion device of the present invention, the controller adjusts the other part of the power supplied to the heater in such a manner that a value obtained by adding the other part of the power supplied to the heater to the one part of the power supplied to the load becomes equal to or lower than a rated power.

In the exhaust gas combustion device of the present invention, the controller electronically controls the power generated by the power generating unit.

The exhaust gas combustion device of the present invention is an exhaust gas combustion device provided to a power generator including a diesel engine whose fuel injection quantity is controlled mechanically and a power generating unit which is driven by the diesel engine. The exhaust gas combustion device comprises: a muffler through which exhaust gas discharged from the diesel engine passes; a heater which heats the exhaust gas before introduced into the muffler; a sensor which measure a pressure of the exhaust gas to be introduced into the muffler; and a controller which controls the heater on the basis of an output from the sensor. The power generating unit is configured to supply power to both a load connected to the power generator and the heater connected to the power generating unit in such a manner as to supply one part of the power to the load and supply the other part of the power to the heater. When a value measured by the sensor is equal to or larger than a predetermined value, the controller increases the power outputted from the power generating unit by allowing the heater to be supplied with the other part of the power generated by the power generating unit, so that a temperature of the exhaust gas discharged from the diesel engine rises, and also that the exhaust gas is heated by the heater.

In the exhaust gas combustion device of the present invention, the controller adjusts the other part of the power supplied to the heater in such a manner that a value obtained by adding the other part of the power supplied to the heater to the one part of the power supplied to the load becomes equal to or smaller than a rated power.

In the exhaust gas combustion device of the present invention, the controller electronically controls the power generated by the power generating unit.

The power generator of the present invention comprises the exhaust gas combustion device having any one of the configurations described above.

According to the present invention, the heater is supplied with power from the power generating unit provided to the power generator, and exhaust gas heated by this heater combusts and removes PM accumulated on the collector or muffler. Thus, the power generator's power generating unit with a large capacity can supply power continuously to the heater so that the collector or muffler can be subjected to a regeneration treatment while keeping the engine operation continuously with no stop.

Moreover, power from the power generating unit is supplied to the heater. Thus, even if the load connected to the power generating unit is a light load, it is possible to create a high-load state as a whole with the load thus connected and the heater as another load added altogether. This, as a result, increases the temperature of the exhaust gas discharged from the diesel engine to a high temperature and thus enhances the effect of heating and combusting PM.

Furthermore, the control on the electrification of the heater during light-load operation enables the heater to be supplied with power equivalent subtraction of the light-load power from the rated power. Use of such large-capacity heater makes it possible to instantly raise the temperature of the exhaust gas.

DESCRIPTION OF THE PREFERRED EMBODIMENTS

<Configurations of Exhaust Gas Combustion Device and Power Generator>

Figure 1:
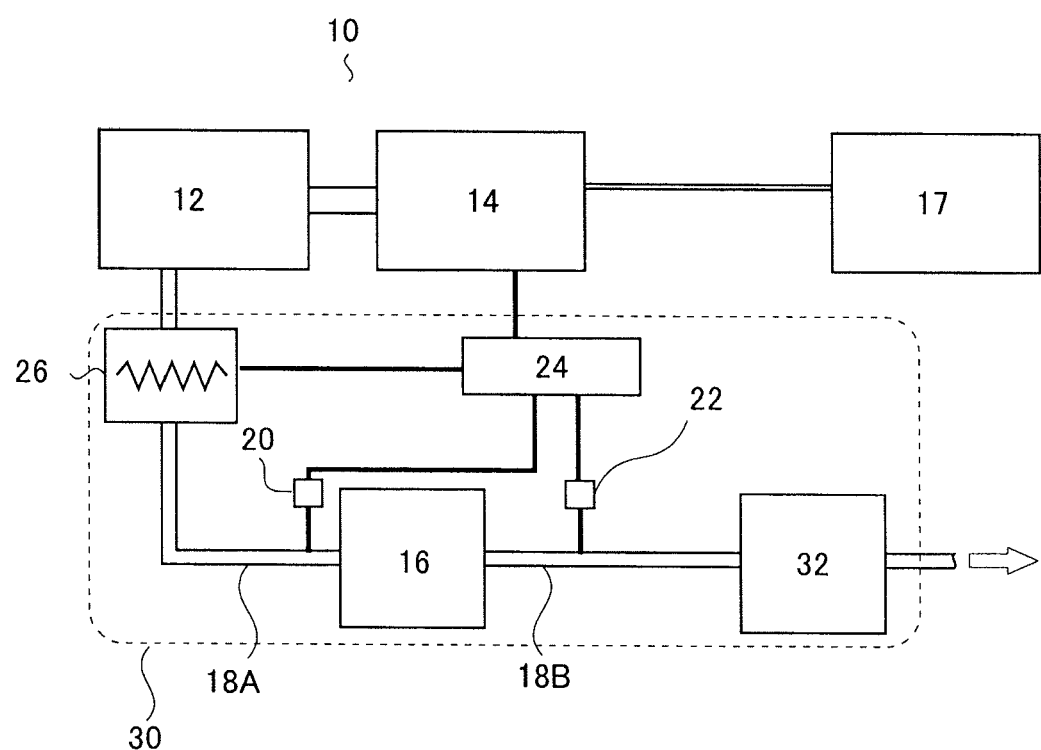
FIG. 1 is a diagram showing a configuration of a power generator including an exhaust gas combustion device of an embodiment of the present invention.

A power generator 10 including an exhaust gas combustion device 30 of an embodiment will be described with reference to FIG. 1. The power generator 10 shown in FIG. 1 actuates a load 17 by driving a power generating unit 14 by an engine 12. Exhaust gas discharged from the engine 12 is released to the outside after combusted by the exhaust gas combustion device 30.

The engine 12 is a diesel engine whose fuel (light oil, etc.) injection quantity is controlled mechanically by a mechanical governor, and has a function of driving (rotating) the power generating unit 14. Specifically, in the engine 12, fuel is compressed and injected by a mechanical injection pump, and the quantity of the injection by this injection pump is controlled by the mechanical governor.

The exhaust gas discharged from the engine 12 is purified by passing through an exhaust pipe 18A, a DPF 16, an exhaust pipe 18B, and a muffler 32 in this order, and then released to the outside. In this embodiment, a diesel engine whose fuel injection quantity is controlled by an inexpensive mechanical governor is employed. Because the engine 12 is not an expensive diesel engine equipped with a common rail injection system, there is an advantage that the power generator 10, which is portable, can be provided inexpensively to the market. The power generating unit 14 generates power when driven (rotated) by the engine 12.

The power generating unit 14 may be a direct-current power generating unit which generates direct-current power or an alternating-current power generating unit which generates alternating-current power. Moreover, if an alternating-current power generating unit is employed as the power generating unit 14, the power to be generated may be single-phase alternating-current power or three-phase alternating-current power.

The load 17 is driven with power generated the power generator 10. Specific examples of the load 17 include a submersible pump, a lighting fixture, or the like. Specifically, in a case of a light load, i.e., a case where the power consumed by the load 17 is equal to or lower than approximately 50% of the rated output of the power generator 10, the exhaust gas discharged from the engine 12 decreases in temperature, making it difficult to combust carbon collected by the DPF 16.

In this embodiment, as will be described later in detail, the level of clogging of the DPF 16 due to collection of PM is measured based on the pressure difference between the exhaust gases before and after the DPF 16. Then, when the pressure difference is equal to or larger than a preset value, the exhaust gas is heated to facilitate combustion removal of the PM. For this reason, the DPF 16 used can be an inexpensive DPF requiring disposition of no oxidation catalyst.

The exhaust gas combustion device 30 is a device to combust the exhaust gas discharged from the engine 12 while removing the PM in the exhaust gas. The exhaust gas combustion device 30 is mainly formed of: the exhaust pipe through which the exhaust gas discharged from the engine 12 passes; the DPF 16 disposed in the middle of the exhaust pipe; sensors 20 and 22; a heater 26 to heat the exhaust gas; a controller 24 to perform control on electrification of the heater 26; and the muffler 32.

The DPF (collector) 16 is an abbreviation for diesel particulate filter. The DPF 16 is formed by accommodating, inside a case, multiple filters each made of a porous material. The exhaust gas is purified because PM contained in the exhaust gas adheres to the surfaces of the filters.

The sensor 20 is a pressure sensor that measures the pressure of the exhaust gas before introduced into the DPF 16. Specifically, the engine 12 and the DPF 16 communicate with each other via the exhaust pipe 18A. The exhaust gas discharged from the engine 12 is introduced into the DPF 16 by way of the exhaust pipe 18A. The sensor 20 measures the air pressure inside the exhaust pipe 18A which the exhaust gas passes through immediately before purification by the DPF 16. A signal indicating the pressure measured by the sensor 20 is transmitted to the controller 24.

The sensor 22 is a pressure sensor that measures the pressure of the exhaust gas after passing the DPF 16. The exhaust gas after the purification treatment with the filters included in the DPF 16 is released to the outside via the exhaust pipe 18B and the muffler 32. The sensor 22 measures the air pressure inside the exhaust pipe 18B which the exhaust gas passes through immediately after discharged from the DPF 16. A signal indicating the pressure measured by the sensor 22 is transmitted to the controller 24 as in the case of the sensor 20.

The controller 24 has a function of controlling the power to be supplied from the power generating unit 14 to the heater 26, on the basis of the information acquired from the sensors 20 and 22. Specifically, a pressure difference is measured based on the pressure values acquired from the sensors 20 and 22. If the pressure difference is equal to or larger than a threshold, power generated by the power generating unit 14 is supplied to the heater 26. On the other hand, if the pressure difference is smaller than the threshold, the heater 26 is not electrified.

In addition, the controller 24 uses chopper control or the like to perform, electrically, voltage control on the power supplied from the power generating unit 14 to the heater 26. In this way, it is possible to adjust the value of an electric current inputted to the heater 26 such that an electric current value obtained by adding the value of an electric current inputted to the load 17 and the value of an electric current inputted to the heater 26 would be equal to or smaller than the rated output of the power generating unit 14. Meanwhile, in a case of chopper control, a direct-current chopper method is employed when the power outputted from the power generating unit 14 is direct-current power whereas an alternating-current chopper method is employed when the power outputted from the power generating unit 14 is alternating-current power.

The heater 26 is disposed at a middle position of the exhaust pipe 18A and has a function of heating the exhaust gas after discharged from the engine 12 but before introduced into the DPF 16. Specifically, the heater 26 is placed either inside the exhaust pipe 18A or near an outer side thereof, and is made of a heating element that generates heat upon receiving power from the power generating unit 14. When the power generating unit 14 is a three-phase alternating-current unit, the heater 26 is formed of three heating elements each receiving alternating-current power of a corresponding layer.

Introduced into the muffler 32 is the exhaust gas from which PM is collected by the DPF 16. Then, the exhaust gas having passed through the muffler 32 is released to the outside. The muffler 32 used is one having a general structure with a silencing effect.

<Operation of Exhaust Gas Combustion Device and Power Generator>

Figure 2:
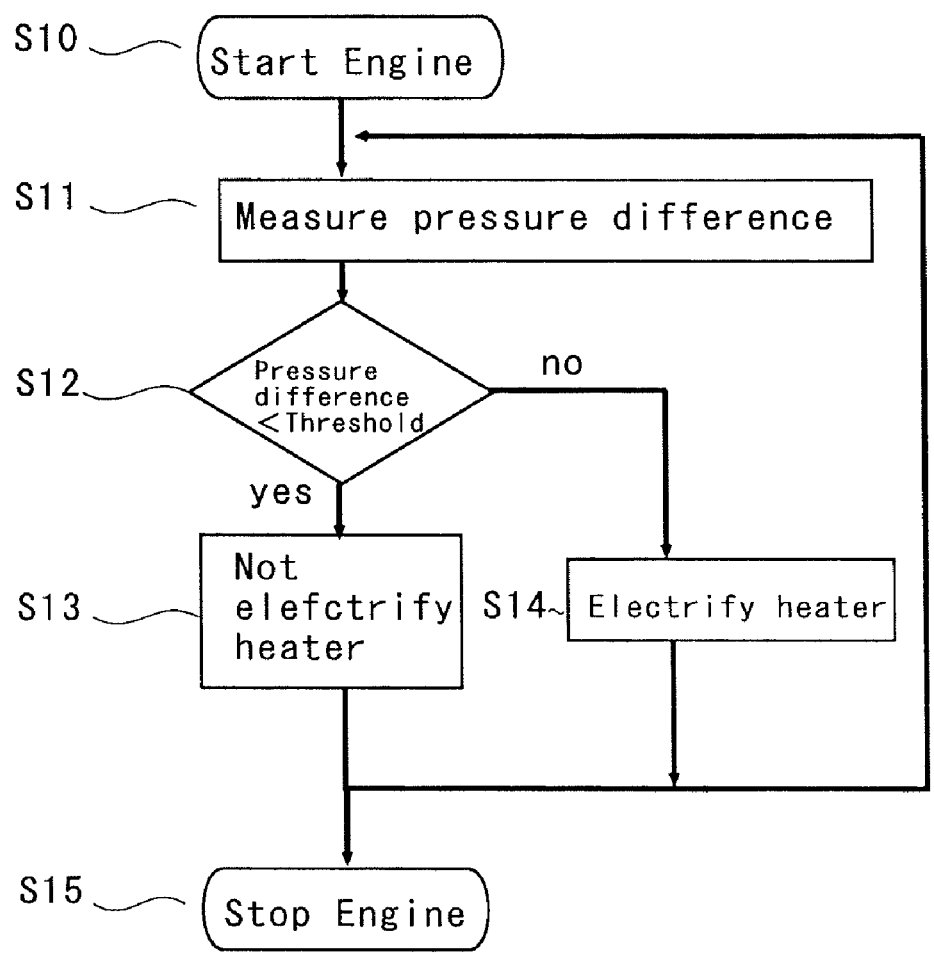
FIG. 2 is a flowchart showing an exhaust-gas combusting method using the exhaust gas combustion device of the embodiment of the present invention.

Next, operation of the exhaust gas combustion device 30 and the power generator 10 having the above-described configurations will be described based on a flowchart shown in FIG. 2 while referring to FIG. 1.

Steps S10 and S11 (Power Generating Operation)

First, the engine 12 provided to the power generator 10 is started. As the engine 12 is started, a rotor of the power generating unit 14 connected to the engine 12 rotates and thus generates alternating-current or direct-current power. The power thus generated is supplied to the load 17.

Exhaust gas produced by the operation of the engine 12 is released to the outside by way of the exhaust pipe 18A, the DPF 16, the exhaust pipe 18B, and the muffler 32. PM contained in the exhaust gas discharged from the engine 12, which is a diesel engine, is collected by the filters included in the DPF 16.

The collected PM is removed by combustion at appropriate timing in order to avoid a decrease in output attributable to accumulation of the PM on the filters included in the DPF 16. Specifically, to combust and remove the PM adhered to the filters on a downstream side, the temperature of the exhaust gas flowing into the DPF 16 needs to be maintained at a high temperature, for example, 600 degrees or higher.

During power generation of the power generating unit 14 through operation of the engine 12, the pressure difference between the exhaust gases before and after the DPF 16 is measured constantly (Step S11). Specifically, the sensor 20 measures the air pressure inside the exhaust pipe 18A which the exhaust gas passes through before introduced into the DPF 16. Further, the sensor 22 measures the air pressure inside the exhaust pipe 18B which the exhaust gas passes through after purified by the DPF 16.

Then, pieces of data indicating the pressures measured by the sensors 20 and 22, respectively, are transmitted to the controller 24.

Step S12 (Measurement and Comparison of Pressure Difference)

Next, the controller 24 calculates the difference between the pressures measured by the sensors 20 and 22 and compares the pressure difference with a preset threshold.

The DPF 16 includes multiple filters therein. These filters are placed in such a fashion to form multiple stages along the passage of the exhaust gas. Hence, a pressure loss occurs when the exhaust gas passes through the DPF 16, producing a difference between pressures before and after the DPF 16. Specifically, the pressure of the exhaust gas upstream of the DPF 16 is higher than the pressure of the exhaust gas downstream of the DPF 16. This pressure difference has a positive correlation with the level of clogging of the DPF 16.

In this embodiment, the controller 24 first calculates the pressure difference by subtracting the pressure measured by the sensor 22 from the pressure measured by the sensor 20.

The controller 24 then compares the calculated pressure difference with a threshold which is a preset pressure difference.

If the calculated pressure difference is smaller than the threshold (YES in Step S12), it is determined that the level of clogging of the DPF 16 is low, and the operation proceeds to Step S13. On the other hand, if the calculated pressure difference is equal to or larger than the threshold (NO in Step S12), it is judged that the level of clogging of the DPF 16 is high, and the operation proceeds to Step S14.

Here, in the diesel engine, clogging of the DPF 16 becomes severe when a large amount of carbon is accumulated on the filters of the DPF 16 due to light-load operation. Specifically, if the measured pressure difference is smaller than the threshold, the engine is judged as being in a high-load operation state. Thus, the heater 26 is not electrified. In contrast, if the measured pressure difference is equal to or larger than the threshold, the DPF is judged as being clogged.

Thus, the heater 26 is electrified to heat the exhaust gas.

Step S13 (Operation without Heating Exhaust Gas with Heater 26)

When the measured pressure difference is smaller than the threshold, the accumulation amount of the PM in the DPF is small or the regeneration treatment of the filters inside the DPF 16 is being performed well due to high-load operation. Thus, the heater 26 is not electrified.

In other words, it is a case where the temperature of the exhaust gas discharged from the engine 12 is equal to or higher than a predetermined temperature (for example, 600 degrees or higher), meaning that the combustion removal of the PM in the DPF 16 is being performed well.

Step S14 (Operation while Heating Exhaust Gas with Heater 26)

When the measured pressure difference is equal to or larger than the threshold, the heater 26 uses the power from the power generator 10 to heat the exhaust gas.

A large difference between pressures before and after the DPF 16 indicates that clogging of the filters included in the DPF 16 has occurred due to accumulation of PM on the filters. As the clogging becomes severe, the efficiency of the power generator drops.

In Step S14, the heater 26 is electrified, so that the exhaust gas passing through the inside of the exhaust pipe 18A is heated to a high temperature (for example, 600 degrees or higher), and then the exhaust gas thus heated is introduced into the DPF 16. In this way, the PM adhering to the surfaces of the filters is combusted and removed. This, as a result, clears the clogging of the DPF 16 and therefore recovers the efficiency of the power generator 10.

Further, in Step S14, the heater 26 is heated using the power from the power generating unit 14 which the power generator 10 is originally provided with. Accordingly, there is no need to provide a separate power generator dedicated for supplying power to the heater 26. In addition, since the power generating capacity of the power generating unit 14 driven by the engine 12 is very large, the capacity of the heater 26 can be made large. Accordingly, the exhaust gas to be flowed into the DPF 16 can be heated to a high temperature in a short period of time.

Furthermore, timing when the heater 26 needs to generate heat due to clogging of the DPF 16 is when the engine 12 is in light-load operation in which the actual output thereof is smaller than the rated output value. Thus, power (for example, 50% or more of the rated power from the power generator 10) obtained by subtracting the power supplied to the load 17 from the rated power may be supplied to the heater 26 so that the exhaust gas can be heated rapidly.

Also, in Step S14, the power generator 10 can be operated in a high-load state even if the load 17 is a light load. Specifically, a value obtained by adding the power inputted to the load 17 to the power inputted to the heater 26 is or above a certain value relative to the rated output value of the power generator 10 (for example, approximately 50% or larger). By creating the high-load state through electrification of the hater 26, the temperature of the exhaust gas discharged from the engine 12 rises to a high temperature, whereby the PM is combusted and removed.

Furthermore, in Step S14, the controller 24 uses chopper control or the like to perform voltage control on the power supplied from the power generating unit 14 to the heater 26. In a case of chopper control, the control is performed by an alternating-current chopper when the power generating unit 14 outputs alternating-current power whereas the control is performed by a direct-current chopper when the power generating unit 14 outputs direct-current power. In the control using such chopper, predetermined power is supplied to the heater 26 by repeatedly turning on and off the power supplied from the power generating unit 14.

In this embodiment, electronic control is performed to prevent overload. Specifically, in a case of chopper control, power obtained by adding the power supplied to the load 17 to the power supplied to the heater 26 is compared with the rated output of the power generator 10. Then, if the added power is larger than the rated output, the ON period in the chopper control is made shorter so that the power supplied to the heater 26 can be reduced. In this way, the total power inputted to the load 17 and the heater 26 is set equal to or smaller than the rated output. This prevents the engine from stopping due to overload.

Meanwhile, if the added power is smaller than the rated output as a result of the comparison (for example, smaller than approximately 50%), then the ON period in the chopper control may be made longer, so that the power supplied to the heater 26 can be increased.

The comparison in Step S12 described above is performed until the difference between the pressures measured by the sensors 20 and 22 becomes smaller than the threshold. When the measured pressure difference becomes smaller than the threshold, the controller is turned off to stop electrification of the heater 26.

The series of operation from Step S11 to Step S14 described above is continuously performed up to Step S15 where the engine is stopped.

<Another Embodiment>

Figure 3:
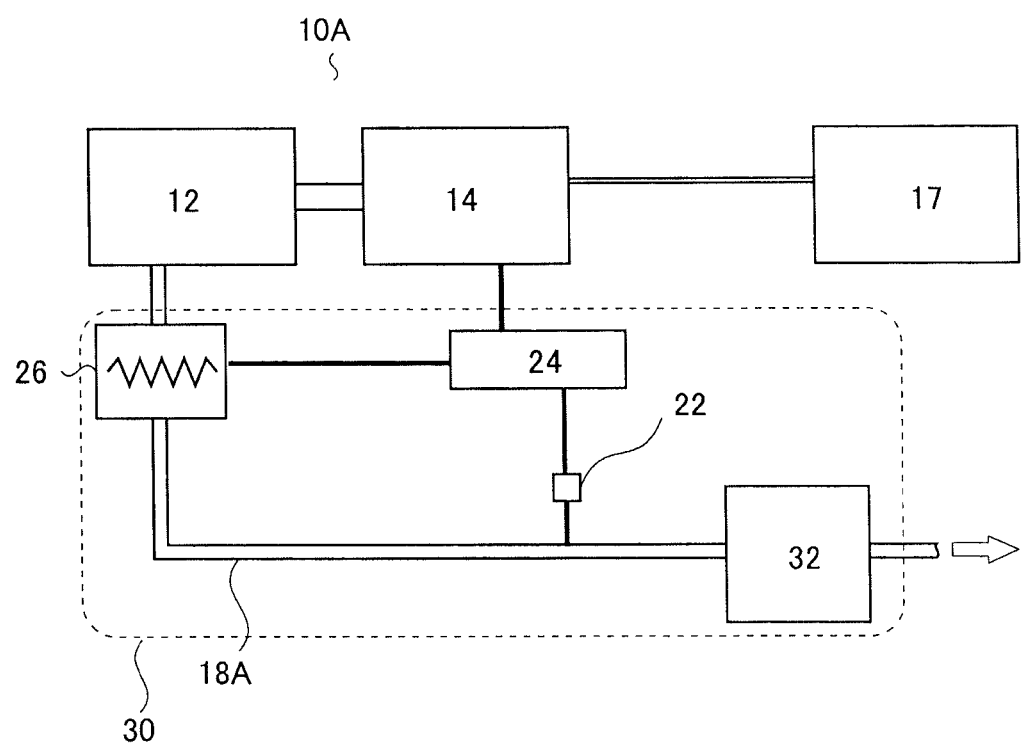
FIG. 3 is a diagram showing a configuration of a power generator including an exhaust gas combustion device of another embodiment of the present invention.

A configuration of a power generator 10A of another embodiment will be described with reference to FIG. 3. The basic configuration and operation of the power generator 10A to be described here are the same as those described above. The difference is that the power generator 10A includes no DPF. The configuration and operation of the power generator 10A will be described below while focusing on this difference.

The exhaust gas combustion device 30 provided to the power generator 10A includes: the muffler 32 into which exhaust gas discharged from the engine 12 is introduced; the sensor 22 which measures the pressure of the exhaust gas before introduced into the muffler 32; and the controller 24 which causes the heater 26 to generate heat when the pressure thus measured is equal to or higher than a predetermined value.

The power generator 10A includes no DPF. Hence, this is a conventional instance where there is no exhaust gas combustion device and thus exhaust gas discharged from the engine 12 is released to the outside without PM in the exhaust gas being collected by the muffler 32. In this embodiment too, light-load operation over a long period of time causes accumulation of carbon-like PM inside the muffler, which in turn increases the passage resistance of the exhaust gas passing through the muffler and thus lowers the engine output.

In the above-described power generator 10, the muffler 32 is placed downstream of the DPF and the pressure difference between the exhaust gases before and after the DPF is measured. In contrast, in the power generator 10A of this embodiment, the exhaust gas just passes through the muffler 32 and is released to the air, and therefore the pressure sensor 22 measures the pressure of the exhaust gas before being introduced into the muffler 32.

Then, the controller 24 compares the measured pressure with a predetermined value (for example, an acceptable exhaust resistance value of the engine 12). If the measured pressure is smaller than the acceptable exhaust resistance value, the level of clogging of the muffler 32 is low, and the heater 26 is therefore not electrified.

On the other hand, if the measured pressure is equal to or larger than the acceptable exhaust resistance value, the level of clogging of the muffler 32 is high, and the heater 26 is therefore electrified to heat the exhaust gas passing through the exhaust pipe 18A. As a result, the heated exhaust gas combusts and removes PM accumulated on the muffler 32.

The heater 26 continues to heat the exhaust gas until the pressure measured by the sensor 22 falls below the predetermined value. In other words, when clogging of the muffler 32 is cleared by the exhaust gas heated by the heater 26, the electrification of the heater 26 is stopped.

It should be noted that the present invention is not limited to a power generator, and is applicable to a working machine including a power generator (such as a welding power generator).

What is claimed is:

1. An exhaust gas combustion device for a power generator comprising a diesel engine whose fuel injection quantity is controlled mechanically and a power generating unit which is driven by the diesel engine, the exhaust gas combustion device comprising:
    a collector which collects particulate matter contained in exhaust gas discharged from the diesel engine;
    a heater which heats the exhaust gas before the exhaust gas is introduced into the collector;
    a sensor which measures a pressure of the exhaust gas to be introduced into the collector; and
    a controller which controls the heater on the basis of an output from the sensor,
    wherein the power generating unit is configured to supply power only to a load connected to the power generator or to both the load and the heater connected to the power generating unit depending on the output from the sensor, and
    when a value measured by the sensor is equal to or larger than a predetermined value, the controller increases the power outputted from the power generating unit so that a part of the power is supplied to the heater and another part of the power is supplied to the load so that a temperature of the exhaust gas discharged from the diesel engine rises and that the discharged exhaust gas is further heated by the heater.

2. The exhaust gas combustion device according to claim 1, wherein the collector is a diesel particulate filter, the sensor comprises a first sensor and a second sensor, the first sensor measuring a pressure of the exhaust gas before the diesel particulate filter, and the second sensor measuring a pressure of the exhaust gas after passing through the diesel particulate filter, and the controller calculates a pressure difference between the pressure measured by the first sensor and the pressure measured by the second sensor, and
    when the pressure difference is equal to or larger than a predetermined value, the controller allows the heater to be electrified to heat the exhaust gas at least to such a temperature that the particulate matter is combusted and removed.

3. The exhaust gas combustion device according to claim 2, wherein the controller adjusts the part of the power supplied to the heater in such a manner that a sum of the part of the power supplied to the heater and the another part of the power supplied to the load is equal to or lower than a rated power.

4. The exhaust gas combustion device according to claim 3, wherein the controller electronically controls the power generated by the power generating unit.

5. An exhaust gas combustion device for a power generator including a diesel engine whose fuel injection quantity is controlled mechanically and a power generating unit which is driven by the diesel engine, the exhaust gas combustion device comprising:
    a muffler through which exhaust gas discharged from the diesel engine is released;
    a heater which heats the exhaust gas before the exhaust gas is introduced into the muffler;
    a sensor which measure a pressure of the exhaust gas to be introduced into the muffler; and
    a controller which controls the heater on the basis of an output from the sensor,
    wherein the power generating unit is configured to supply power only to a load connected to the power generator or to both the load and the heater connected to the power generating unit depending on the output from the sensor, and
    when a value measured by the sensor is equal to or larger than a predetermined value, the controller increases the power outputted from the power generating unit so that a part of the power is supplied to the heater and another part of the power is supplied to the load so that a temperature of the exhaust gas discharged from the diesel engine rises and that the discharged exhaust gas is further heated by the heater.

6. The exhaust gas combustion device according to claim 5, wherein the controller adjusts the part of the power supplied to the heater in such a manner that a sum of the part of the power supplied to the heater and the another part of the power supplied to the load is equal to or lower than a rated power.

7. The exhaust gas combustion device according to claim 5, wherein the controller electronically controls the power generated by the power generating unit.

8. A power generator comprising the exhaust gas combustion device according to claim 1.

9. A power generator comprising the exhaust gas combustion device according to claim 5.

* * * * *